(12) United States Patent
Efros

(10) Patent No.: US 7,293,789 B1
(45) Date of Patent: Nov. 13, 2007

(54) WIDE POWER RANGE BICYCLE WITH POSITIVE INTUITIVE GEAR SHIFTING SYSTEM

(76) Inventor: Boris Efros, c/o Gina Efros, 581 North Windsor Blvd., Los Angeles, CA (US) 90004

( * ) Notice: Subject to any disclaimer, the term of this patent is extended or adjusted under 35 U.S.C. 154(b) by 0 days.

(21) Appl. No.: 11/454,058

(22) Filed: Jun. 15, 2006

(51) Int. Cl.
*B62M 1/08* (2006.01)
*B62M 1/04* (2006.01)

(52) U.S. Cl. .................. 280/251; 280/253; 280/258; 280/243

(58) Field of Classification Search ............ 280/251, 280/253, 258, 243
See application file for complete search history.

(56) References Cited

U.S. PATENT DOCUMENTS

| | | | |
|---|---|---|---|
| 4,041,788 A | 8/1977 | Nininger, Jr. | |
| 4,161,328 A | 7/1979 | Efros | |
| 4,226,435 A | 10/1980 | Efros | |
| 4,263,818 A | 4/1981 | Ozaki | |
| 4,272,096 A | 6/1981 | Efros | |
| 4,300,784 A | 11/1981 | Efros | |
| 4,421,334 A | 12/1983 | Efros | |
| 4,421,336 A | 12/1983 | Petrofsky et al. | |
| 4,574,649 A * | 3/1986 | Seol | 74/138 |
| 4,616,840 A | 10/1986 | Green | |
| 4,630,839 A * | 12/1986 | Seol | 280/255 |
| 4,666,174 A | 5/1987 | Efros | |
| 5,178,033 A | 1/1993 | Kund | |
| 5,213,548 A | 5/1993 | Colbert et al. | |
| 5,358,451 A | 10/1994 | Lacombe et al. | |
| 5,419,572 A | 5/1995 | Stiller et al. | |
| 5,765,847 A | 6/1998 | Toronto et al. | |
| 5,988,662 A * | 11/1999 | Staehlin | 280/253 |
| 6,142,899 A | 11/2000 | Liu et al. | |
| 6,371,891 B1 | 4/2002 | Speas | |
| 6,699,161 B1 | 3/2004 | Speas | |
| 6,746,034 B2 | 6/2004 | Fowles | |
| 6,920,953 B2 * | 7/2005 | McGovern | 180/205 |
| 2003/0020254 A1 | 1/2003 | Weaver, II | |
| 2006/0066072 A1* | 3/2006 | Scarborough | 280/253 |

* cited by examiner

*Primary Examiner*—Lesley D. Morris
*Assistant Examiner*—Marlon Arce-Diaz
(74) *Attorney, Agent, or Firm*—Fulwider Patton LLP

(57) ABSTRACT

A pedal lever type bicycle includes a pedal lever having a front portion and a rear portion, with an intermediate pivot point located substantially above the center of the rear wheel, and to the rear of the front of the rear wheel. The rear portion of the pedal lever has dog-leg configuration with a slider that is attached to a drive chain. The slider is mounted on a straight section of the rear portion of the pedal lever which extends slightly above and to the rear of the rear wheel hub, so that the chain exerts a force to move the slider outwardly on the rear portion of the pedal lever when it is in a lower position, and in the opposite direction when it is raised. Changes of mechanical advantage of 3 or 4 to 1 are available with this configuration of the pedal lever. The bicycle incorporates positive intuitive gear controls and quick release mechanisms for all major components of the propulsion system.

32 Claims, 11 Drawing Sheets

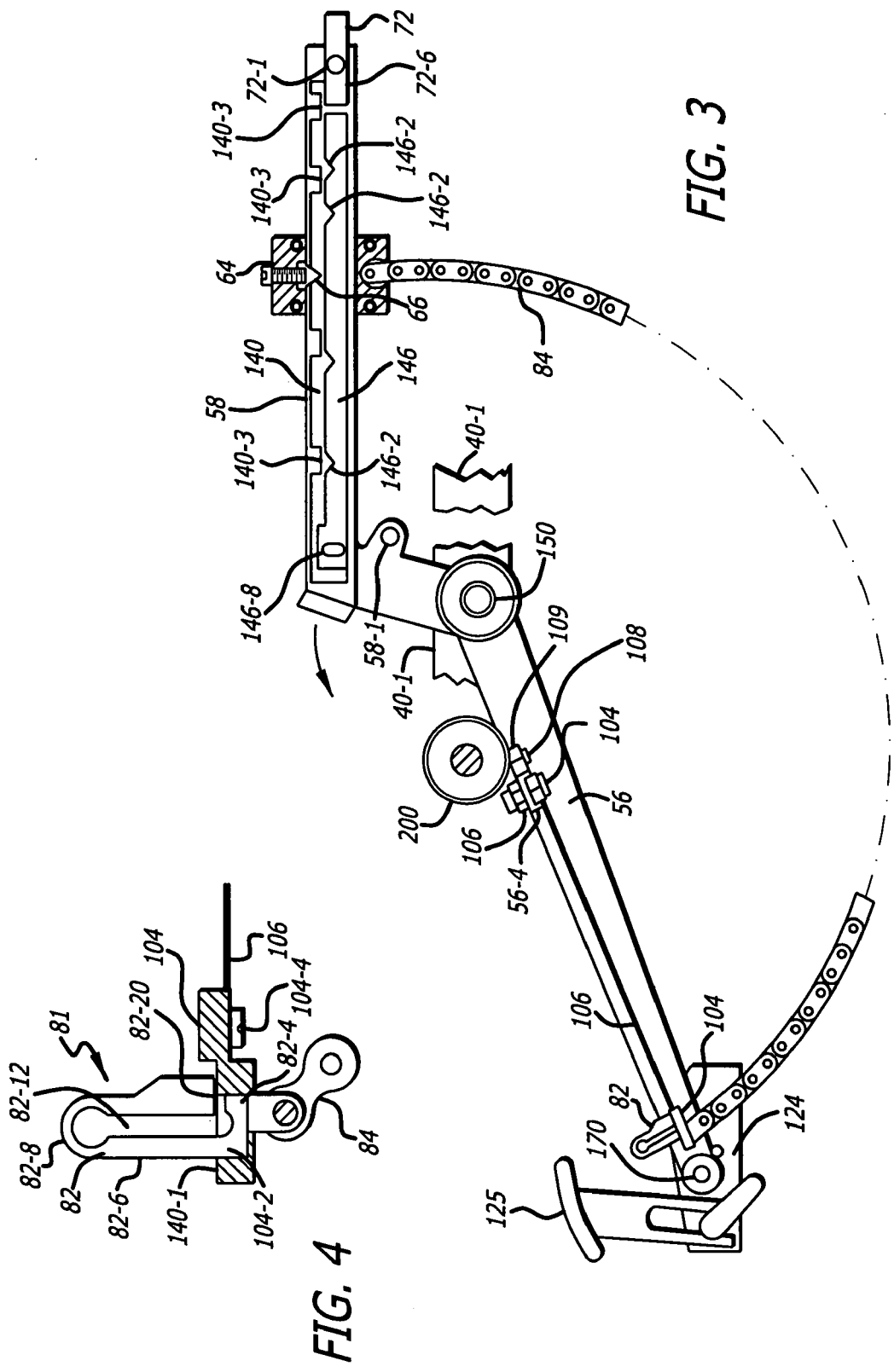

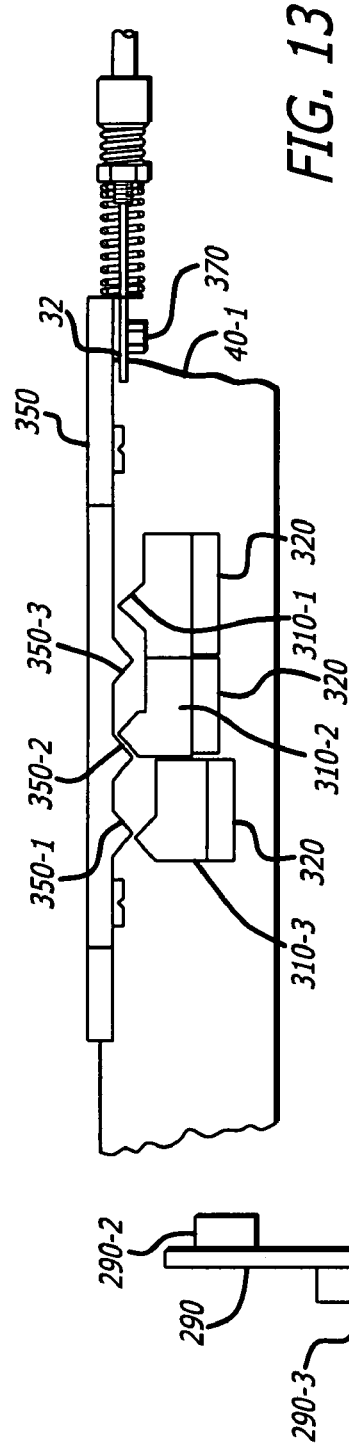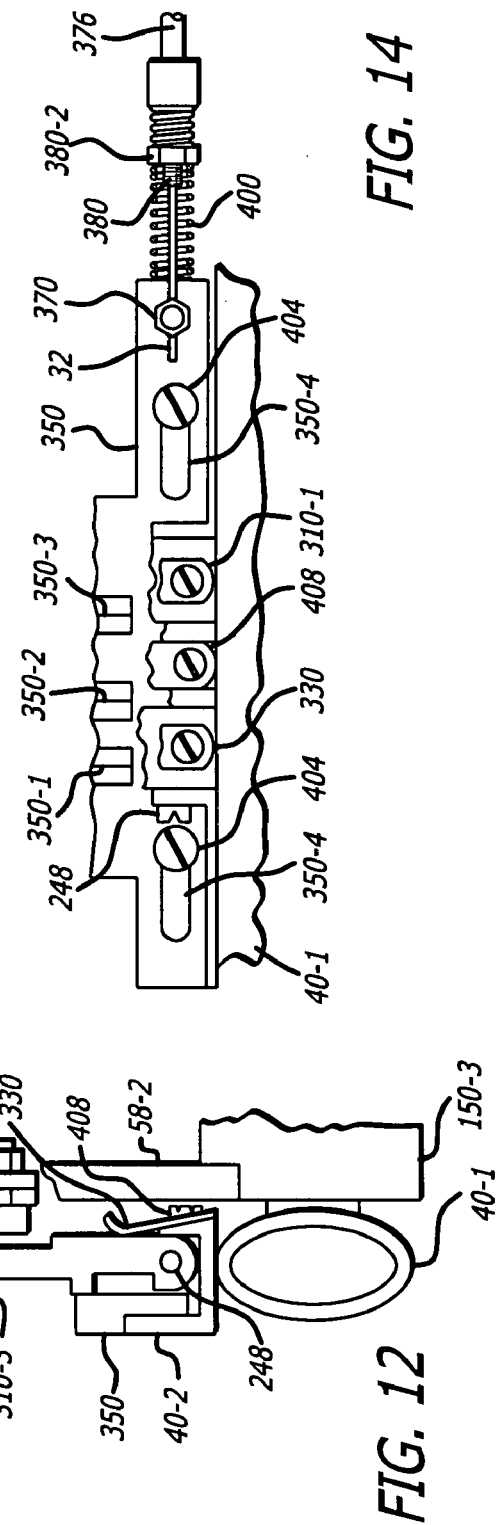

WIDE POWER RANGE BICYCLE WITH POSITIVE INTUITIVE GEAR SHIFTING SYSTEM

FIELD OF THE INVENTION

The invention relates to pedal lever type bicycles.

BACKGROUND OF THE INVENTION

My prior designs of pedal lever bicycles are disclosed in U.S. Pat. Nos. 4,272,096; 4,300,784; 4,421,334; and 4,666,174. Another type of pedal lever bicycle which has been advertised and shown at bicycle shows is that advertised by a company known as Alenax.

While my prior bicycles were much more efficient than conventional bicycles, some minor shortcomings were found to be present in these revolutionary bicycles. Specifically, the upward movement of the sliding member on the pedal lever was made possible by a force of the spring. Consequently, the gear shifting lever, mounted on the lower front section of the bicycle frame and moved by fingers, requiring to overcome the resistance of the spring. And like in any existing bicycles, it was possible to miss the chosen gear.

My present invention provides for positive shifting, forced by movement of the leg during the stroke. Accordingly, the principal object of the present invention is to provide a clean overall mechanical design for a pedal lever bicycle which obviates all of the shortcomings mentioned hereinabove.

SUMMARY OF THE INVENTION

In accordance with the present invention, a pedal lever bicycle of the general type discussed hereinabove includes a pedal lever having a front portion and a rear portion, with a substantially central pivot point located to the rear of the front of the rear tire and at an elevation substantially above that of the center of the rear wheel. In addition, the rear portion of the pedal lever may have a dog-leg type configuration, with a short upwardly directed section near the pivot point, and an elongated portion extending to the rear, on which the power ratio adjusting slider, attached to the drive chain, is mounted.

With this arrangement, an extended range of power ratios may be obtained as a result of the available long range of movement of the slider, and the slider may be positive and easily moved as the bike is being pedaled.

Other features which contribute to the mechanical simplicity and efficacy of the new design may include any or all of the following:

(1) The frame can be relatively small, and correspondingly light weight, with the front and rear wheels
(2) The front and rear ends of the pedal lever may be substantially aligned with the pedal lever pivot.
(3) The downward travel of the pedal levers may be limited by engaging the short dog-leg section of each pedal lever.
(4) An idler-wheel with the quick release mechanism may be employed in the coupling of each chain to spring attached to the forward portion of the corresponding pedal lever.
(5) The travel of the forward part of the pedal lever may be through an arc of about ninety degrees, or somewhat more than ninety (90) degrees in the angular range where the bicycle rider may exert the maximum power from the legs to drive the bicycle forward.
(6) The rider's seat may be mounted only slightly forward of the rear hub, thereby permitting a shorter wheel base, a smaller lighter frame, and better handling of the bicycle.
(7) The gear selector has a push button for each gear and is mounted on the handlebar close to the brake lever.
(8) The power of shifting the gears is provided by the legs of the rider during the stroke.

Other objects, features, and advantages will become apparent from a consideration of the drawings and the following description.

BRIEF DESCRIPTION OF THE DRAWINGS

FIG. 3 is a side view of the pedal lever assembly, including both the front portion of a pedal lever and the rear portion thereof including some elements of the gear shifting mechanism;

FIG. 4 is an enlarged view of the coupling shown in FIG. 3;

FIG. 12 is a view of the above mentioned portion of the mechanism in FIG. 11;

FIG. 13 is a side view of the shifting mechanism of one embodiment of the present invention.

FIG. 14 is a top view of the shifting mechanism of FIG. 12;

DETAILED DESCRIPTION OF THE INVENTION

Figure 1:
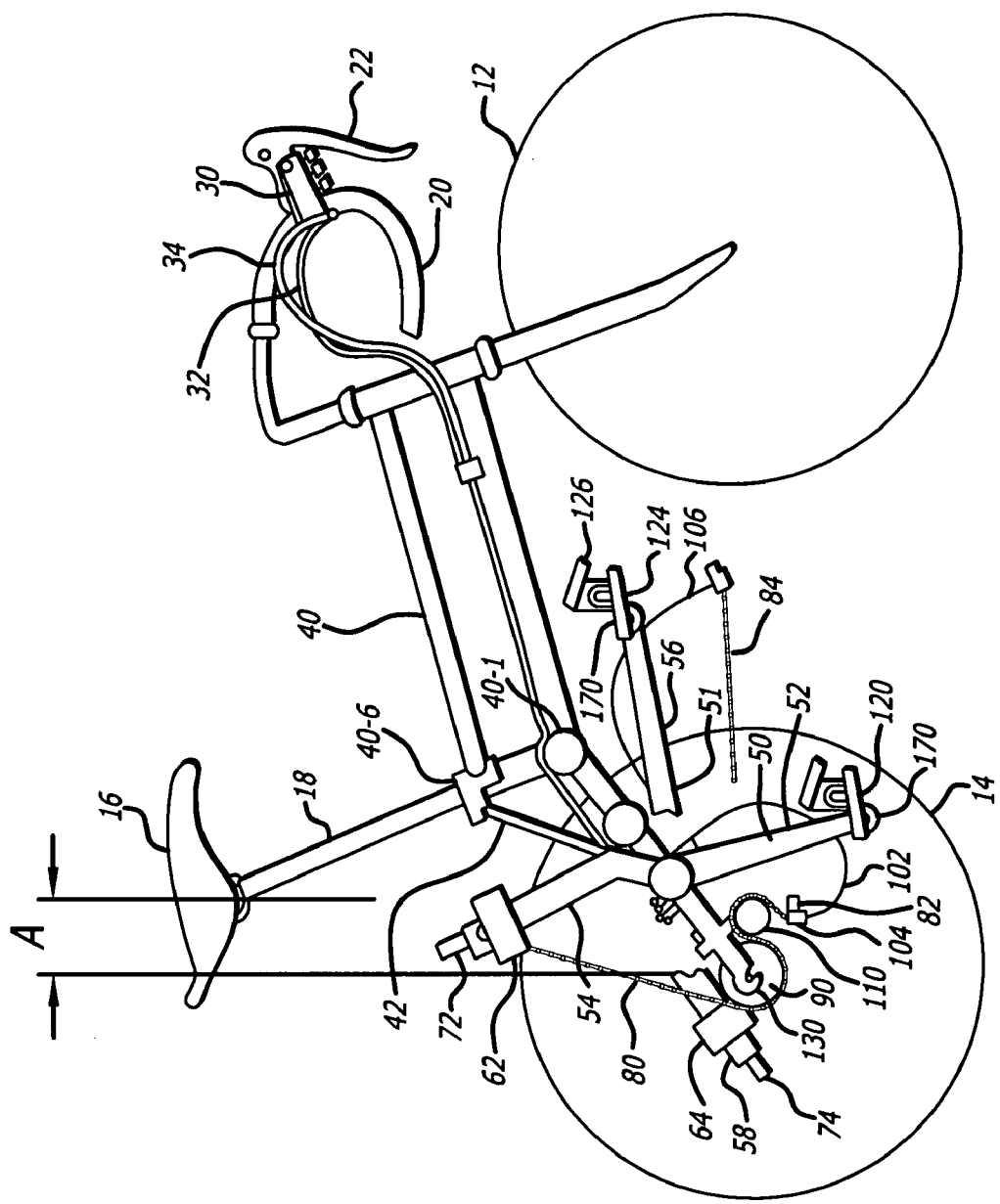
FIG. 1 is a side view of preferred embodiment of a pedal lever bicycle illustrating the principals of the present invention.
Figure 2:
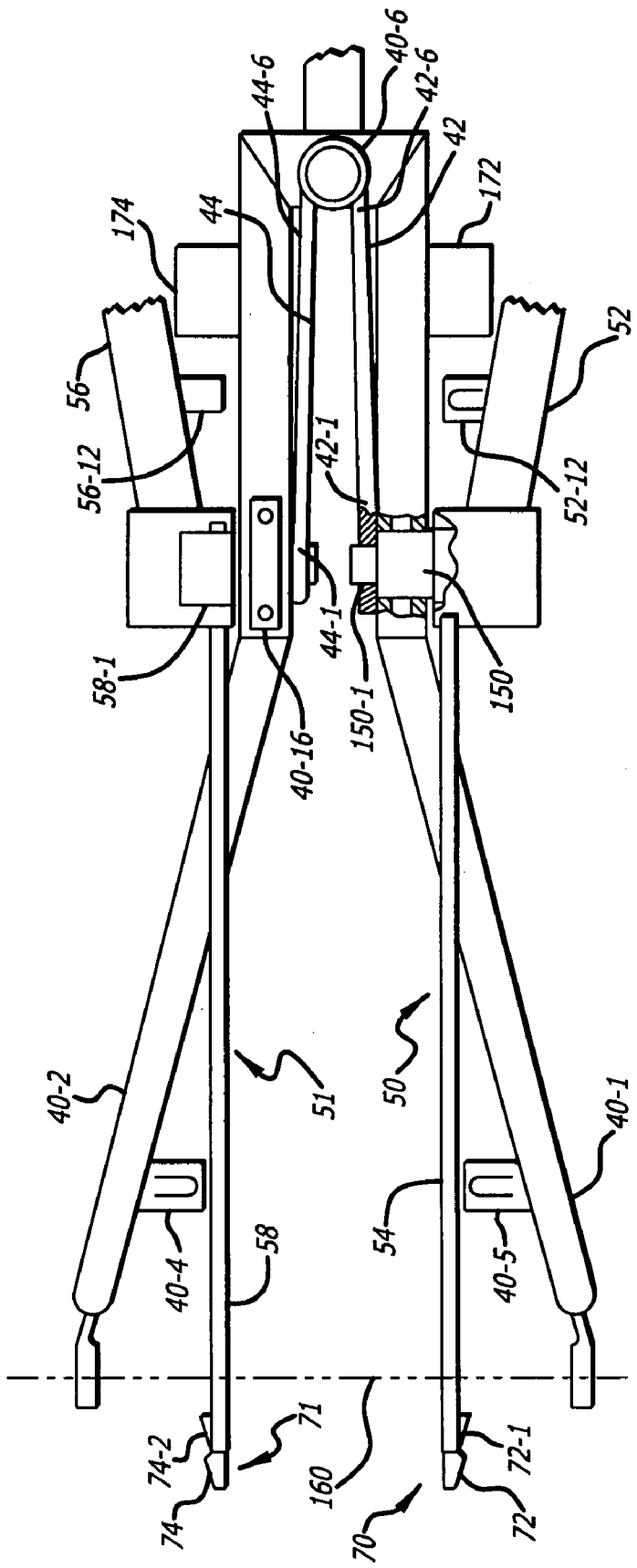
FIG. 2 is a partial top view of the bicycle in FIG. 1, showing an enlarged view of the rear portion of the bicycle of FIG. 1.

Referring now in more detail to the drawings for purposes of illustration, wherein like reference numerals designate corresponding or like elements among the several views, there is shown in FIGS. 1 and 2 a bicycle having a front wheel 12, a rear wheel 14, a seat 16, a seat post 18, a handlebar 20, a brake levers 22, a gear selector unit 30 with a push-button for each selected gear, cables 32 and 34 connecting unit 30 to the rear portions of the frame 40. The bicycle is propelled by a pair of pedal levers 50, 51, with pedal lever 50 having a front portion 52 and a rear portion 54, while pedal lever 51 has a front portion 56 and a rear portion 58. As will be explained further hereinbelow, rear portion 54 of pedal lever 50 has a means 70 allowing quick release of a slider 62 mounted on rear portion 54, while the rear portion 58 of pedal lever 51 also has a means 71 allowing a quick release of the slider 64 on that pedal lever. Two rearwardly extending frame members 40-1 and 40-2 extend from the frame of the bicycle to the rear hub 130.

Sliders 62 and 64, as will be discussed in more detail below, provide for changing the "gear ratio," or mechanical advantage of the mechanism that provides motive force to the wheels of the bicycle. Quick release means 70 and 71 prevent the sliders 62 and 64 from accidentally sliding off the pedal lever rear portions 54 and 58 and also provide for instant removal of sliders 62 and 64 if desired.

A first chain 80 is secured to the first slider 62 at one end and extends over a sprocket 90 mounted on the rear hub 130 of the bicycle. The sprocket 90 applies power to the wheel 14 through a clutch (not shown). The other end of the chain 80 goes over a first idler wheel 110 and is secured at a plate 104 and a self-locking clip 82 to a flexible, resilient member, such as leaf spring 102 mounted to the front portion 52 of the first pedal lever 50 and extending substantially upward from the pedal lever. Similarly, a separate corresponding second chain 84 intercouples the second slider 64 with a second sprocket (not shown) which in turn applies power to the wheel through a separate clutch. The other end of the chain 84 goes over a second idler wheel (not shown) that is substantially identical to the first idler wheel, and is secured at a plate 104 and a self-locking clip 82 to a flexible, resilient member, such as leaf spring 106 mounted to the front portion 56 of the second pedal lever 51 and extending substantially upward from the pedal lever.

The first and second idler wheels are mounted on the rear portion of the bicycle frame with a quick release mechanism that will be described in more detail below. The front portions 52 and 56 of the pedal levers 50, 51 are provided with pedals 120 and 124 respectively, each including arrangements for engaging the top of the foot, so that the pedals may be readily restored to their upward positions. In this regard, it may be noted that each of the pedals is independent in its mode of operation from the other pedal so that two pedals can be activated in unison, alternately, or using only one pedal while holding the other pedal at rest, as may be desired or as may prove convenient for the rider.

In other words, a rider may propel the bicycle by depressing and releasing only one pedal. When additional power is desired, such as when climbing a hill, or when the rider desires to increase the speed of the bicycle, both pedals may be actuated. This is in contrast to other prior art pedal lever bikes wherein the two pedal levers are intercoupled by complex linkages or cables, making for less convenient and less flexible modes of operation of the bicycle as well as involving increased complexity and cost.

Another significant advantage of the various embodiments of the present invention is that the dog-leg sections 58-1 and 58-2 (shown in FIG. 12) of the rear portions 54 and 58 of the pedal levers 50, 51 allow the force provided by the downward pressure of a rider's leg and foot against the pedal to provide positive activation of the sliders 62 and 64 to change gear ratios while the rider continues to pedal the bicycle.

More specifically, as shown in FIG. 1, positive downward pressure is applied to slider 62 by the chain 80 when rear portion 54 of pedal lever 50 is in the upward position. Similarly when a rear portion of a pedal lever is in its lower position, as indicated by the rear portion 58 of pedal lever 51 in FIG. 1, positive rearward pressure is applied by the chain 84 to the slider 64.

It will be apparent to those skilled in the art that this dog-leg configuration provides an extremely long range of travel for the slider. Further, as mentioned above, positive shifting may be accomplished while the bicycle rider continues pedaling.

An additional advantage provided by the various embodiments of the present invention is that strut members 42 and 44 of the frame 40 provide for increase torsional stiffness of the frame, while being nearly half the length of traditional parts of the frame usually called "seat stays." As is illustrated in FIG. 1, because of this, the horizontal distance A between the tip of the seat post and the pivot point of the rear wheel is at least five inches shorter than that distance on existing bicycles with similar wheel size.

FIG. 2 is a partial cross-sectional view taken through the pivot point 150 of the two pedal levers and through the center of the seat post 40-6. Visible in FIG. 2 are the forwardly extending portions 52 and 56 of the two pedal levers and the correspondingly rearwardly extending portion 54 and 58 respectively. At the farthest downward positions of the forwardly extending portions of the pedal levers 50, 51, the dog leg sections of the rear portions 54, 58 of the pedal levers contact resilient stops 172 and 174, respectively, limiting downward movement of the front portions of the pedal levers. It may be noted that the rearwardly extending portions of the pedal levers 54 and 58 may be relatively thin in the horizontal direction but moderately wide in the vertical cross section direction, in order to provide adequate strength. It may also be noted that these two rearwardly extending portions 54 and 58 may be spaced fairly close together, such as 2¾ or 3 inches apart, which clearly precludes interferences with the rider's leg movements. Little transverse thickness is required of these rear portions, as there is virtually no lateral force on these rear portions of the pedal levers. However, the forwardly extending portions 52 and 56 of the pedal levers must withstand considerable torque as well as force in the vertical direction; accordingly, they are typically of oval or circular cross sections and have a moderately heavy wall thickness to withstand the strain imparted by the rider of the bicycle while vigorously actuating the pedals.

Also shown in FIG. 2 are the rearwardly extending frame members 40-1 and 40-2 which extend from the lower end of the frame 40 to the center of the rear wheel, which is rotatably mounted at about the line 160 as shown in FIG. 2. It may be noted that these rearwardly extending frame members 40-1 and 40-2 extend close to the wheel up to the pivot points, which are outside of these frame members, and then flare outwardly to support the rear wheel hub.

Quick release means 70 and 71 are also shown in more detail in FIG. 2. Quick release means 70 includes a lever 72 and a pin 72-1 mounted at the rearward tip of the rear portion 54 of the pedal lever 50. Actuation of lever 72 causes pin 72-1 to depress, allowing slider 64 to be removed from pedal lever 50. Similarly, quick release means 71 includes a lever 74 and a pin 74-2 mounted at the rearward tip of the rear portion 58 of the pedal lever 51. Actuation of lever 74 causes pin 74-2 to depress, allowing slider 64 to be removed from pedal lever 51.

Quick release mechanisms for the first and second idler wheels are mounted on the brackets 40-4 and 40-5 on the rear portion of the frame. Struts 42 and 44 are secured at their lower ends 42-1 and 44-1 to the forward ends of the rearwardly frame members 40-2 and 40-1, respectively. Upper ends 42-6 and 44-6 of struts 42 and 44 are secured to the portion of the frame 40-6 usually called the "seat post."

Leaf springs 102 and 106 are mounted on the brackets 52-12 and 56-12. A mounting plate 40-16 on the left portion of the frame 40-2 provides a location for mounting a portion of the gear control system, which will be discussed in more detail below, to the rear end of the frame. A corresponding mounting plate (not shown) is located on the forward portion of the rearwardly extending frame member 40-1.

FIG. 3 is a side view of one of the pedal levers, showing it in somewhat greater detail than was possible in the assembly drawing of FIG. 1. In this view, the pedal lever is oriented in reverse from that shown in FIG. 1, with the front portion 56 of the pedal lever extending to the left, and the rear portion 58 of the pedal lever extending to the right in FIG. 3. The pin 72-1 is a protruding portion of the quick release mechanism shown in FIG. 2. The slider 64 is adjustable to various positions along the length of the rear portion of the pedal lever 58, with the spring biased detent 66 holding the slider 64 in the position as determined by the alignment of the notches 140-3 and 146-2 in the fixed plate 140 and the relatively movable plate 146. More specifically, the movable plate 146 selects the appropriate one of the notches 140-3, and displaces the lower tapered end of the detent 66 as the plate 146 is shifted longitudinally. The slider 64 moves along the length of the rear portion 58 of the pedal lever until the spring biased detent 66 drops it into locking engagement with one of the recesses 140-3. The first and second sliders 62, 64 each include a spring biased detent 66 that releasably engages the notches 140-3 and 146-2 in the first fixed notched plate 140 and the second notched plate 146, respectively, and relative movement of the first and second notched plates is operative to disengage the spring biased detent 66 from the notches 140-3 and 146-2 in the first and second notched plates 140 and 146 to free the first and second sliders 62, 64 for longitudinal movement on the first and second pedal levers 50, 51 respectively, by resolution of force applied to the first and second sliders 62, 64 by the first and second drive chains 80, 84, respectively. Incidentally, this changing of gear ratios or mechanical advantage ratios may be accomplished while the rider is continuing to pedal the bicycle. It is further noted that mechanisms of the type disclosed and discussed hereinabove, are described in great detail and form the principal subject matter of my prior U.S. Pat. Nos. 4,421,334, and 4,666,174 cited hereinabove.

Referring now to FIGS. 1, 3 and 4, it will also be apparent that the chain 84, after passing over the sprocket on the rear hub and the idler sprocket, is connected by a self-locking clip or clamp 82 to the leaf spring 106 which is mounted by a bracket 56-4 to the front portion 56 of the pedal lever 51. The leaf spring 106 may be adjusted laterally in bracket 56-4 and is then locked in place by the threaded fastener 104-4.

Incidentally, the pedal 124 is pivotally mounted at point 170 to the front end of the forward portion 56 of the pedal lever. The member 126 is a foot clip of pedal 124. As shown in FIG. 1, member 126 is provided to engage the upper portion of the foot, or the toes, in order to raise the front portion of the pedal lever to its upward position, to start the power cycle again.

Stop 200 is mounted to the frame, and serves as a stop for the upward direction of travel of the front portion of the pedal lever. Thus, in FIG. 3, the stop 200 is shown in engagement with the adjusting screw 108 which is threaded into a nut 109 which is in turn secured to a short extended portion of spring 102.

FIG. 4 is a side view, partially in cross-section, of a quick release mechanism 81 providing for rapid release of the end of chain 84 from engagement with leaf spring 106. Bracket or plate 104 is attached to an end of leaf spring 106 by fastener 104-4. The bracket or plate 104 includes an opening 104-2 through which the self-locking coupling or spring clip 82 may be disposed. Spring clip 82 has a rectangular bottom portion 82-4 which is attached to an end of chain 84. Spring clip 82 also has a resilient, moveable arm or sprung portion 82-10, which is biased in an open position, as shown in FIG. 4. The spring force is typically large enough to maintain moveable arm portion 82-10 in an open position, but still allow moveable arm portion 82-10 to be depressed. The spring clip preferably includes a straight side 82-6, a round portion 82-8 at the top, and the resilient, moveable arm portion 82-10 includes an exterior ramp portion 82-3. A cross-cut 82-20 from the moveable arm portion 82-10 to a slot 82-12 allows the moveable arm portion 82-10 to move toward the slot 82-12 when squeezed. The solid bottom portion 82-4 is slidingly fitted in the rectangular opening 104-2. The downward force of the chain 84 causes the open edge of the moveable arm at the cross-cut 82-20 to move in the direction away from the slot 82-12, enhancing locking.

The operation of quick release mechanism 81 is as follows. Chain 84 may be attached to leaf spring 106 by inserting the round portion 82-8 of the spring clip 82 through opening 104-2 of the end plate portion 104-1 of the bracket or plate 104. As the round portion 82-8 traverses through opening 104-2, the ramp portion 82-3 of the spring clip 82 engages the sides of opening 104-2, depressing the moveable arm portion 82-10 until the moveable arm portion 82-10 of the spring clip 82 is able to pass completely through opening 104-2. Once moveable arm portion 82-10 passes through opening 104-2, the spring bias of spring clip 82 allows the resilient, moveable arm portion 82-10 to return to the open position, which prevents the spring clip 82 from being removed from bracket 104. The resilient, moveable arm portion 82-10 similarly may be depressed until the moveable arm portion 82-10 passes nto opening 104-2, allowing spring clip 82 to be pulled or pushed through opening 104-2 to disconnect chain 84 from the leaf spring 106.

Figure 5:
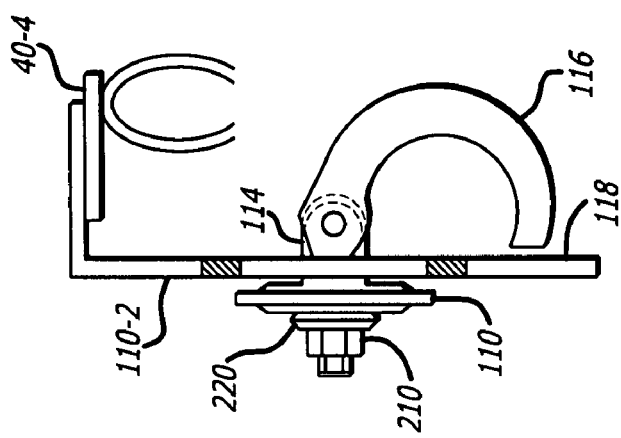
FIG. 5 is an illustration of the mounting arrangement of the idler wheel of the bicycle of FIG. 1.

FIG. 5 shows the idler wheel 110 secured on a slotted plate 110-2 by means of a spindle 114, a spring washer 220, a nut 210, and a locking cam-lever 116. This arrangement provides for quickly releasing the idler wheel 110 to allow easy removal of the chain from the wheel sprocket to facilitate changing a tire on the wheel should the tire be punctured.

Figure 6:
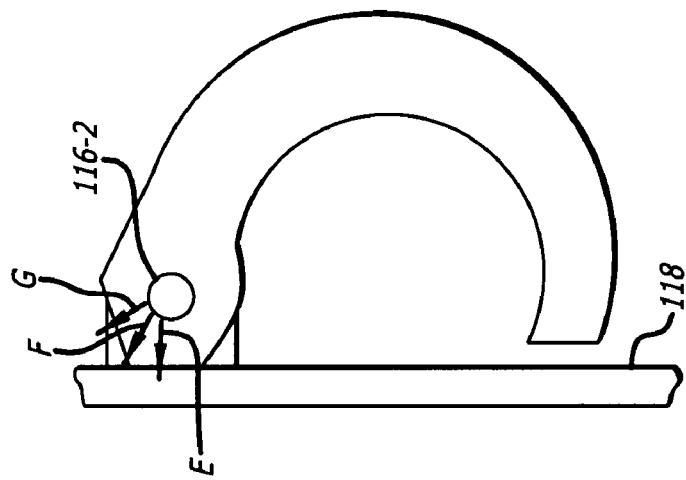
FIG. 6 is an oversized view of the securely locked cam-lever of the idler wheel assembly.

FIG. 6 is an enlarged view of the cam-lever 116 of FIG. 4. This figure illustrates the relationship of facets formed on one end of the cam lever. As shown, The distance F is larger than distance E and larger than the distance G, which is the distance between the hole 116-2 and the plate 110-2 in FIG. 4 when the idler wheel is unlocked. The spring washer 220 provides a needed movement and the force necessary to positively lock the idler wheel 110 in a chosen position on the plate 110-2. In a fixed, seated position shown in FIGS.

5 and 6, the handle of the cam-lever 116 is seated adjacent to the distal end 118 of the plate 110-2.

Figure 7:
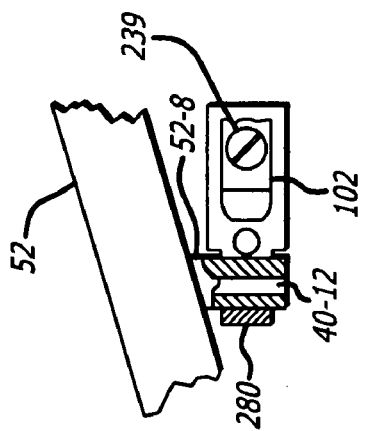
FIG. 7 is an alternative means of mounting the leaf spring on the front portion of the pedal lever.

FIG. 7 illustrates an alternate way of mounting leaf spring 102 to the front portion 52 of pedal lever 50. Spring 102 is secured by a fastener 239 to a clip 280, which in turn is secured to pivot 40-12, which is part of tab 52-8 attached to front portion 52 of pedal lever 50. This arrangement allows for both lateral and angular adjustment of the spring.

Figure 8:
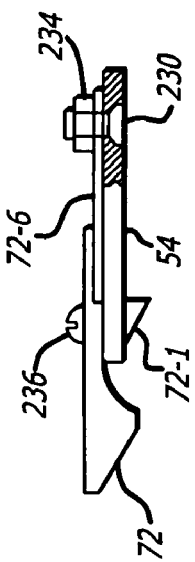
FIG. 8 shows a mechanism that allows a quick removal of the slider from the pedal lever.

FIG. 8 is an enlarged view of one embodiment of quick release assembly 70, previously described with reference to FIG. 2. Lever 72 is attached to leaf spring 72-6 at one end. The end of the spring which is not attached to the lever 72 is secured to the rear portion 54 of the pedal lever 50 by the threaded fastener 236. The rear portion 54 of the pedal lever is attached to the leaf spring 72-6 by a threaded fastener 230 and nut 234. The pin 72-1 is attached to the lever 72 by the threaded fastener 236. When the lever 72 is depressed, pin 72-1 retracts, allowing the slider (not shown) to be removed from the pedal lever.

Figure 9:
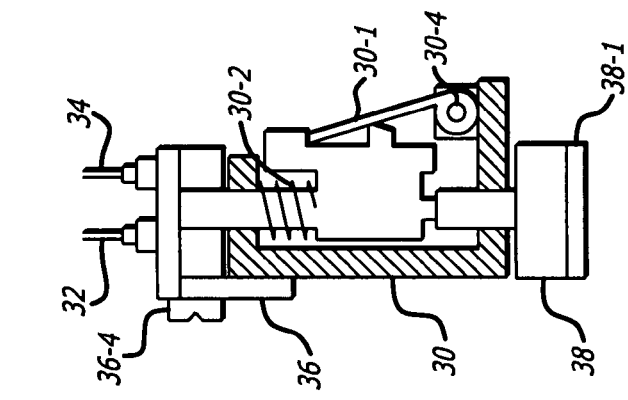
FIG. 9 is a cross section of a gear selector shown in FIG. 1.

FIG. 9 is rear view of gear selector 30 showing details of the mechanism actuated by the fingers of a cyclist to cause the gearing of the bicycle to change. Gear selector 30 is operated by, for example, depressing button 38-1. When button 38-1 is depressed, common latch 30-1 is turned about fixed axis 30-4, releasing buttons 38-1 and 38-2 which are returned to their original positions by springs 30-2, 30-6 and 30-8. Pivot 36-4 attaches the lever 36 to the assembly 30. Two cables 32 and 34 are mounted on the tip of the lever 36 and communicate with the shifting assembly shown in FIG. 2.

Figure 10:
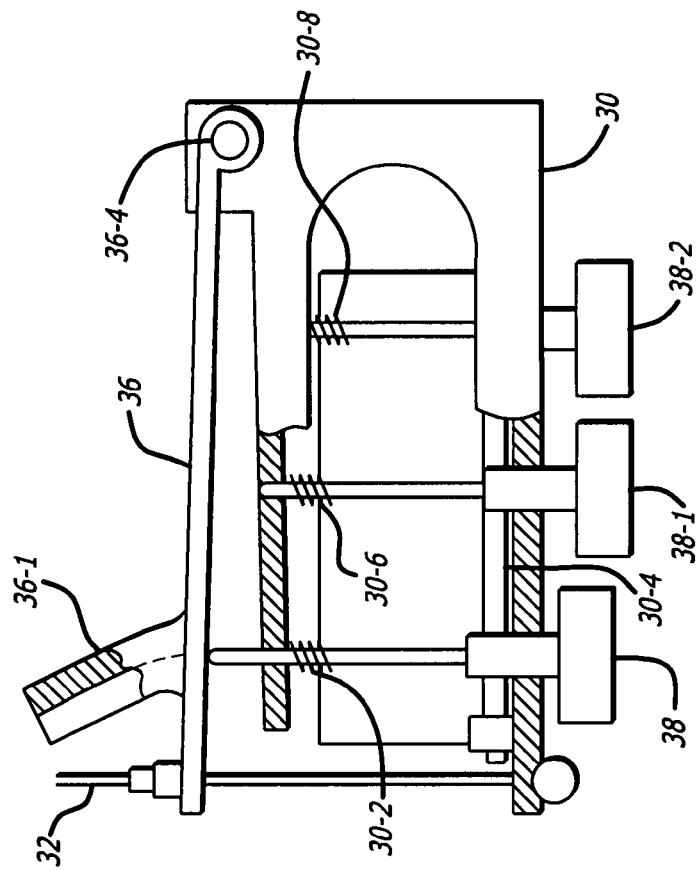
FIG. 10 is a side view of the gear selector in FIG. 1.

FIG. 10 is a side view of gear selector 30. The lever 36 is secured to the handlebar or to the brake lever and does not move. When the button 38-1 is depressed, actuating link 38, link 38 pushes assembly 30 against the lever 36, pulling the cables 32 and 34. The travel of the cable is maximum when link 38 is depressed, as shown in FIG. 10. Link 38 and button 38-1 serves as the selector of a high gear. Mount 36-1 extends from a housing enclosing the various components of the gear selector 30 and is secured to the handlebar by a clip.

It will be apparent that gear selector 30 can be simplified, eliminating the cam-profile shape of the links in FIG. 9 and the common latch. It is obvious that in such a scenario the buttons of the links will be on the same level, so the rider's finger will not feel what gear is engaged, except for the feeling of the effort of pedaling the bicycle.

Figure 11:
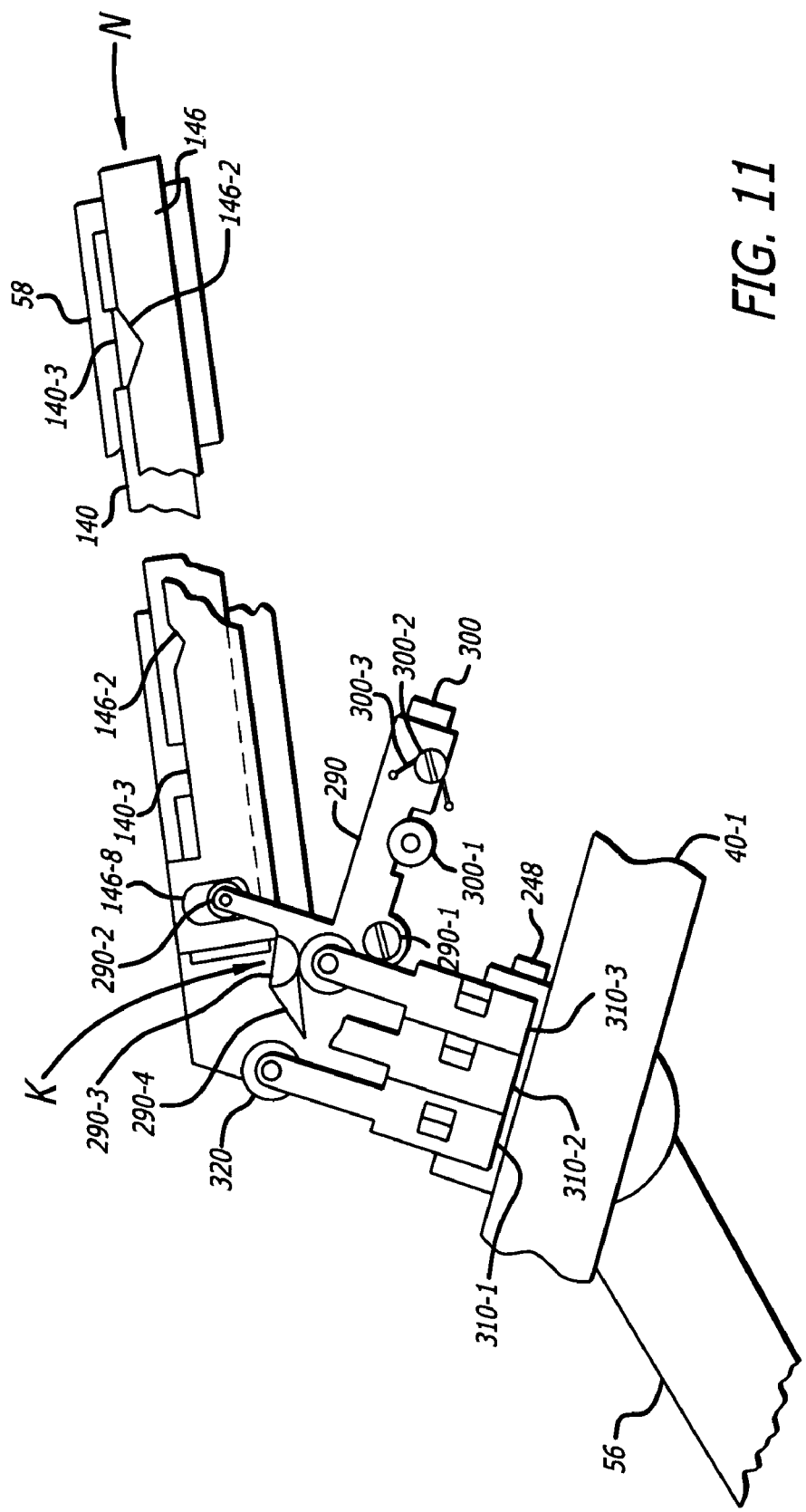
FIG. 11 is a side view of the rear portion of the pedal lever including the gear shifting plate mounted on the pedal lever and a portion of the gear shifting mechanism mounted on the frame.

FIG. 11 is a side view of the portion of the pedal lever and the gear shifting mechanism mounted on the rear lower part of the frame 40-1. Longitudinally extending fixed plate member 140 is provided with a plurality of notches or slots 140-3 and is rigidly secured to the rear portion 58 of the pedal lever 51. The relatively moveable plate or release member 146 is movably mounted on the rear portion of the pedal lever 58, and has a plurality of notches or slots 146-2. Slider 64 (as shown in FIG. 3) is slidably mounted on members 140 and 146, and includes a spring biased detent 66 configured to engage the notches or slots 140-3 and 146-2. The slider 64 is positively locked in position when the notches or slots 140-3 and 146-2 are lined up and the detent 66 engages the desired notches or slots.

Stops 310-1, 310-2 and 310-3 are pivotally mounted on the lower rear portion 40-1 of the frame. There is typically one stop for each gear provided with the rollers 320. For example, if the bicycle is designed to operate with two gears, there will only be two stops. For three gears, there will be three stops, and so on. The stops 310-1, 310-2 and 310-3 are retractable and oscillate about common axle 248. Oscillating member 290 is pivotally mounted on the dog-leg portion 58-1 of the pedal lever 50; and pivots about pivot 290-1. Roller 300-1 is mounted on lever 300 and oscillates about pivot 300-2. Lever 300 is biased by spring 300-3 in the clockwise direction relative to oscillating member 290. This arrangement is advantageous in that if one of the stops 310-1, 310-2 or 310-3 does not retract as appropriate during shifting of the gears of the bicycle, lever 300 pivots down, bypassing the stop and preventing damage to the mechanism.

Protruding cam-shaped portion 290-3 of the member 290 is shown contacting roller 320 of the stop 310-3 at K, which causes the vertical portion of member 290 to move in the direction N to the right. Roller 290-2 is situated in slot 146-8 of the movable plate member 146, causing movable plate member 146 to move, changing the position of the slider (not shown) and thus changing the gear. It is understood that shifting occurs when the rear portion 58 of the pedal lever 51 moves downward (an idle stroke) or upward (a power stroke). All the downshifting in the arrangement in FIG. 11 occurs during the idle stroke of the rear portion 58 of the pedal lever 51. The upshifting occurs during the power stroke.

FIG. 12 is a side view of the mechanism in FIG. 11 shown perpendicular to the view of FIG. 1. A slanted portion of the stop 310-3 is shown in contact with a corresponding slanted portion of plate 350 (also see FIG. 14). In this position, stop 310-3 engages member 290-3. Spring 330 pushes the stop to its normal retractable position. Incidentally, all stops are normally retracted. Also shown is a side view of the oscillating member 290; roller 300-1 is mounted on the lever 300. Also shown as 58-2 is the dog-leg portion of the rear portion 58 of the pedal lever 51. Springs 330 are secured by screws 408. Center portion 150-3 of the pedal lever connects the front portion 56 of the pedal lever to the rear portion 58 of said pedal lever 51.

FIG. 14 is a top view of the mechanism shown in FIGS. 11 and 12. In this view, slanted portions 350-1, 350-2 and 350-3 of plate 350 and the slanted portion of stops 310-1, 310-2 and 310-3 and rollers 320 are visible.

FIG. 13 is a side view of the mechanism shown in FIG. 14. In this view, only lower portions of the stops 310-1, 310-2 and 310-3 are seen. The gear selection plate 350 is provided with slots 350-4 and is slidably mounted on frame member 40-1 by screws or bolts 404. The plate 350 is also provided with the slanted portions 350-1, 350-2 and 350-3. Spring 400 normally biases the gear selection plate 350 to its maximum rearwardly extending position as shown in FIG. 14 when slanted portion 350-1 and 310-3 are lined up.

As is illustrated in FIG. 13, a rear end of the cable 32 is secured to the plate 350 by threaded member 370. Typically, threaded member 370 includes a threaded shaft with a holed bored therethrough into which the end of cable 32 is threaded. A locking mechanism, such as a nut can then be tightened on the threaded shaft to hold the end of cable 32 in place relative to plate 350. As is known by those skilled in the art, further adjustment of the cable 32 to provide for fine adjustment of the location of plate 350 relative to the central point 150-3 of the pedal lever to adjust the shifting of the gear mechanism is accomplished using an arrangement of members 376, 380 and 380-2. The front end of the cable 32 is attached to the gear selector 30 as shown in FIGS. 1 and 10. As will also be apparent to those skilled in the art, compression spring 400 may be substituted by any of a variety of springs or other devices attached to the other end of the plate 350 to bias plate 350 appropriately.

Figure 15:
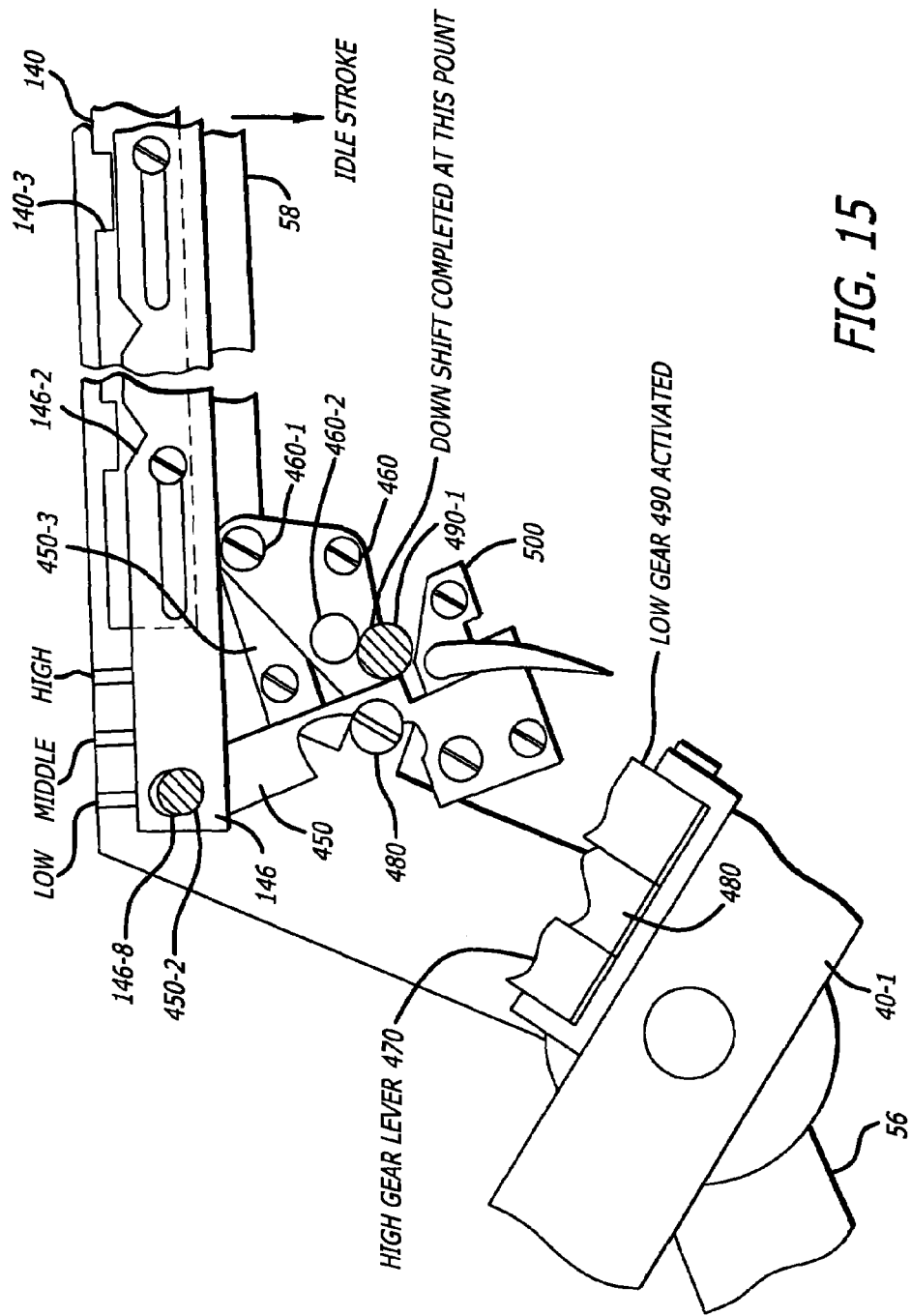
FIG. 15 is a side view of an embodiment of the shifting assembly of the present invention showing the assembly configured to activate a low gear.
Figure 16:
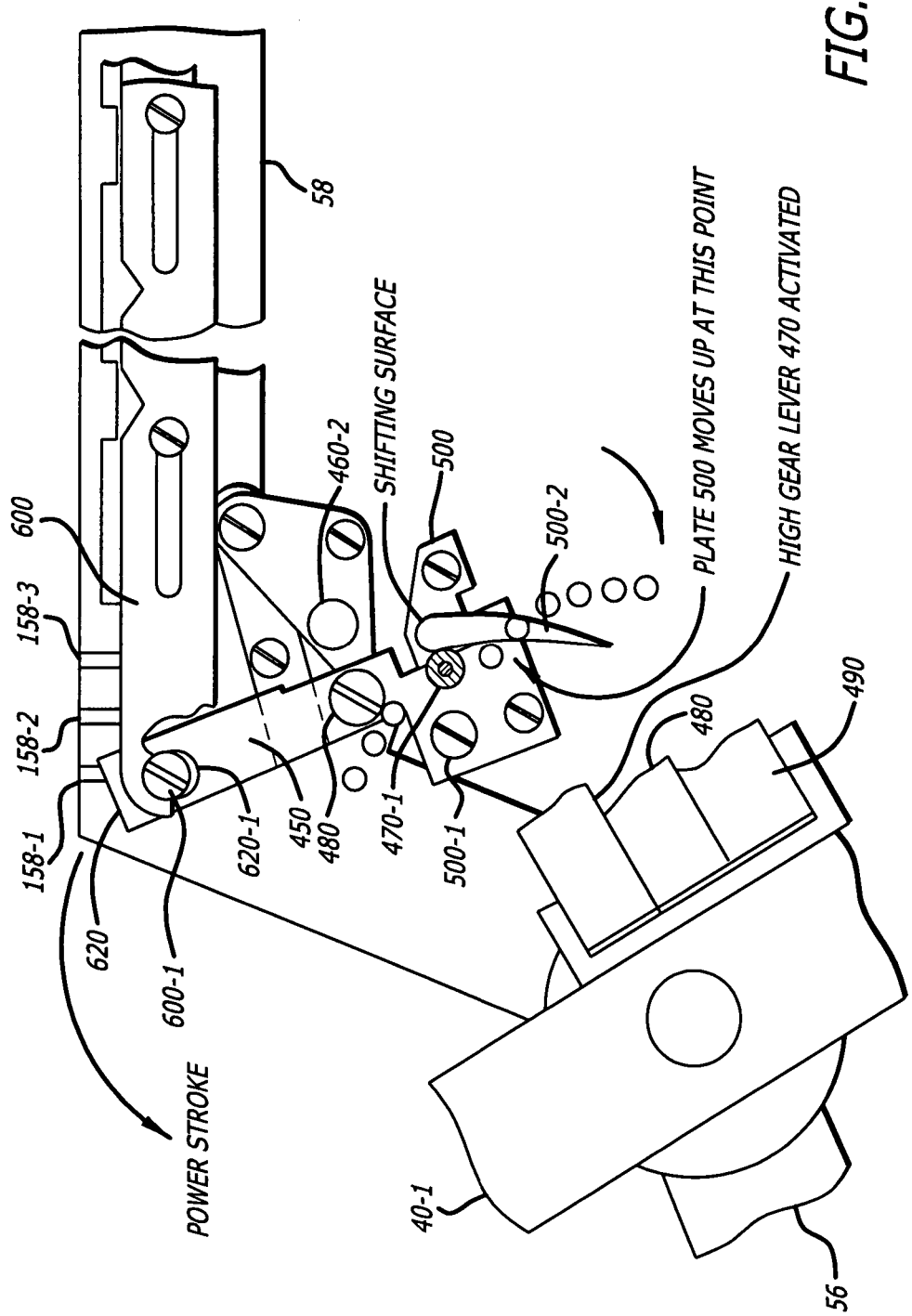
FIG. 16 is a side view of the shifting assembly of the present invention showing the assembly in an intermediate state between low gear and high gear.
Figure 17:
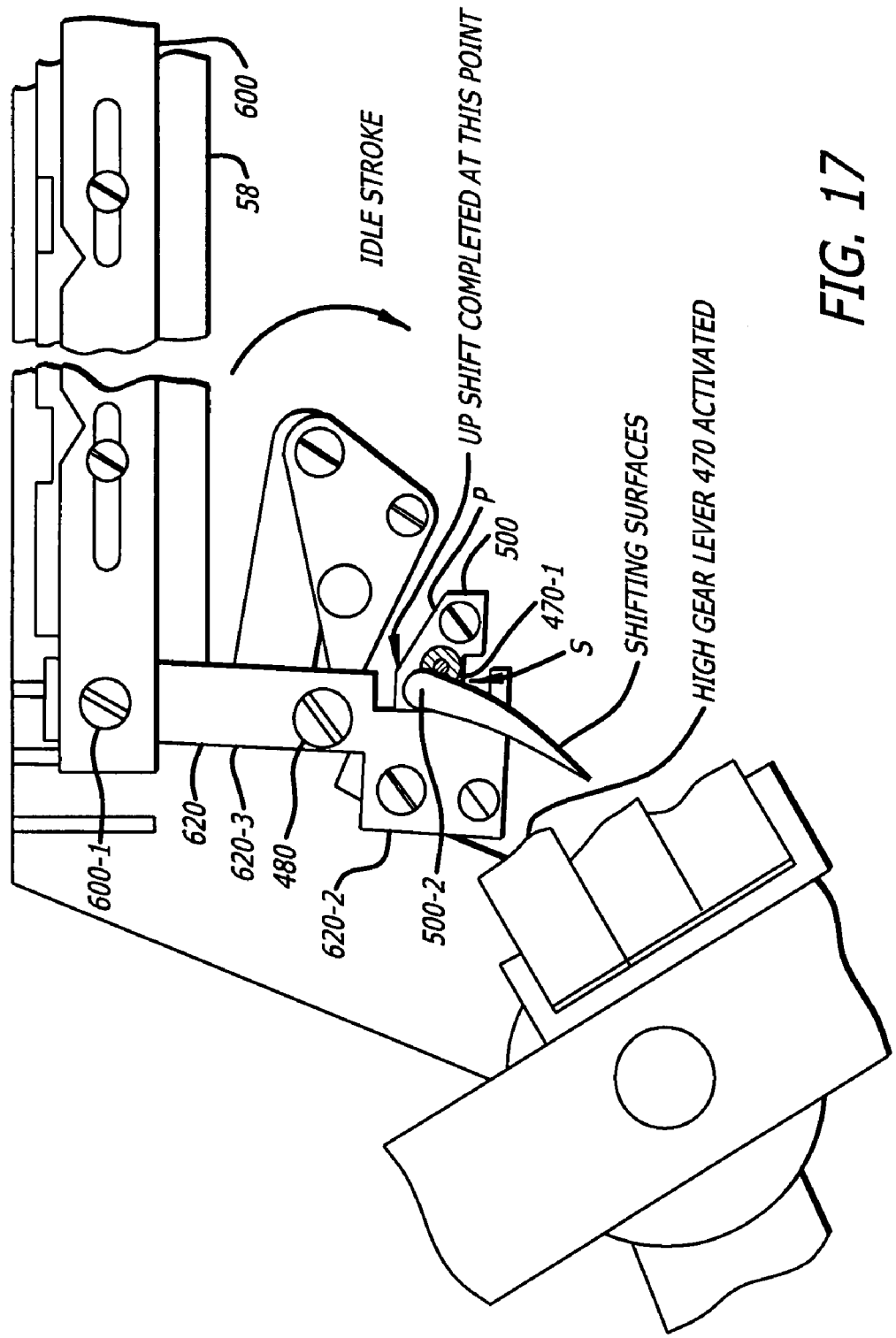
FIG. 17 is a side view of an embodiment of the shifting assembly of the present invention showing the assembly configured to activate a high gear

FIGS. 15 through 17 illustrate the operation of an alternate embodiment of the novel gear shifting arrangement of the present invention. FIG. 15 shows an embodiment of the gear shift assembly in accordance with the present invention configured to activate the low gear of the shifting assembly. As seen in this figure, moveable release plate 146 is biased all the way to the left relative to holding screws 700, 702. The mechanism on the rear portion 58 of pedal lever 51 comprises two pivotally mounted, spring biased plates 460 and 500. Plate 460 provides downshifting capability and is located above the pivot 480 of the oscillating lever 450. Plate 500 is mounted on lever 450 and provides for upshifting. Plate 500 is located below the pivot 480. Roller 460-2 is mounted on plate 460. Downshifts occur when the rear portion 58 of the pedal lever 51 moves counter-clockwise (the idle stroke). If lever 490 is activated during the power stroke, roller 460-2 is pushed up, preventing unwanted shifting. The protruding member 450-2 is situated on the top portion of lever 450, and pushes movable plate 146 to the left. Roller 490-1 is situated on the top of lever 490. Grooves 158-1, 158-2 and 158-3 assist in fine tuning the portion of the shifting mechanism mounted on the frame.

When the bicycle user wishes to change to high gear, the user activates the appropriate button on the gear changer assembly 30. As shown in FIG. 16, high gear lever 470 causes actuator 470-1 to move into contact with shifting surface 500-2. As the cyclist pushes down on the pedal during the power stroke, actuator 470-1 moves along the curved surface of the shifting surface, imparting movement to the shifting surface that is translated to oscillating lever or arm 450, which causes oscillating lever or arm 450 to pivot about pivot 480, moving plate 600 to the right. This movement to the right results in movement of the slider 64 (FIG. 1) such that a higher gear is obtained. The shift is completed during the idle stroke as the pedal moves upward.

FIG. 16 also illustrates the situation during the power stroke when high gear lever 470 is activated but upshifting is undesirable. The movable plate 600 is similar to plate 146 of FIG. 15, except for its left tip which is rigidly secured to the spring ball plunger 600-1. The top portion of lever 620 is provided with a slot 620-1. The ball plunger provides a resistance necessary to prevent undesirable movement of movable plate 600. The ball plunger 600-1 also contacts the grooves 158-1, 158-2 and 158-3, and provides an indexing function for the gear shift assembly.

Downshifting to a lower gear is illustrated by the arrangement shown in FIG. 14. Low gear lever 490 is activated, which in turn cause roller or actuator 490-1 to engage post 460-2 mounted on plate 460. When roller or actuator 490-1 engages post 460-2, the engagement results in a force that pivots plate 450 about pivot 480 such that plate 146 moves to the left of the figure (towards the pedal). It will be appreciated that the unique design of this assembly overcomes any resistance to shifting that may occur due to the close tolerances and engagement of the various components because the actual shifting is initiated during the power stroke, that is, by the downward pressure of the rider on the pedal.

FIG. 17 further illustrates the working of the shift mechanism during upshifting. The cam-shaped portion 470-1 of lever 470 is in contact with surface S of the cam-shaped shifting surface 500-2. Arrow P indicates the direction of movement of lever 470 pushing portion 620-2 of lever 620 to the left and the upper portion 620-3 of lever 620 moving to the right, causing the upshifting.

Figure 18:
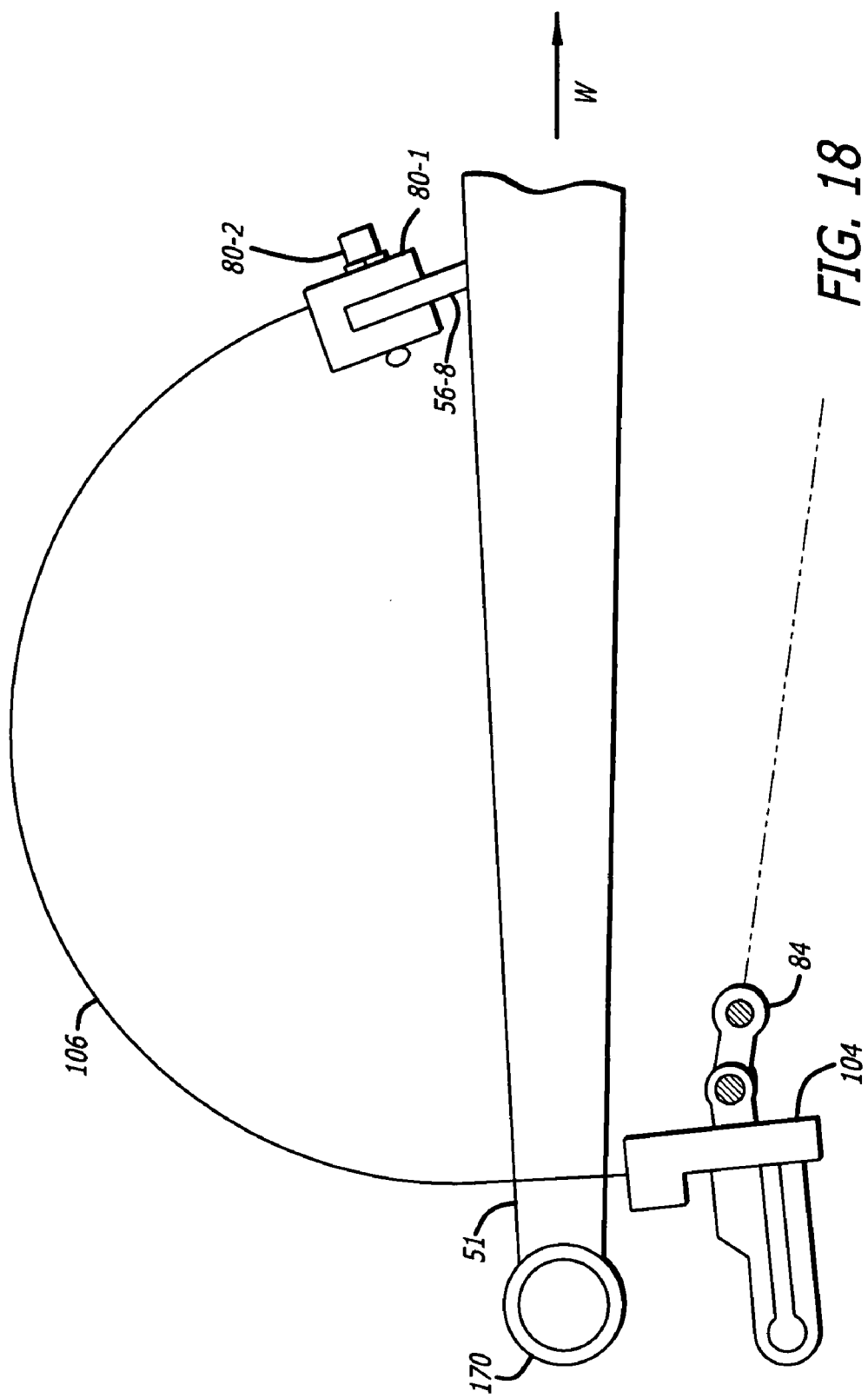
FIG. 18 is a showing an alternative embodiment illustrating an arrangement for biasing the drive chain.

FIG. 18 demonstrates another arrangement for mounting the leaf spring 106 on the front portion 56 of the pedal lever 51. The upright position of the spring 106 provides greater tension for the chain 84 than the similar spring 102 (FIG. 3), longitudinally mounted on the bracket 56-8 of the pedal lever 51. One end of the leaf spring is rigidly attached to the plate 104. The other end of the leaf spring is rigidly attached to the plate 80-1 and can be moved laterally on the bracket 56-8 allowing the spring 106 to be aligned with the idler wheel 110 and the sprocket (or cog) 90 (FIG. 1). It is secured in position by fastener 80-2. Bracket 56-8 is closer to the tip 170 of the front portion 56 of pedal lever 51 than the bracket 56-4 (FIG. 3), providing a clearance W for the caliper type brakes (not shown).

While all shifting described hereinabove occurs when the foot of the rider moves up (the idle stroke), other arrangements are available, giving flexibility to the designer of the bicycle design the shifting mechanism as needed to accommodate various bicycle sizes or configurations. Moreover, while each of the figures illustrating the present invention show the right side of the bicycle, it will be understood that the bicycle includes two totally independent pedal levers, pivotally mounted on either side of the frame, and that shifting mechanism are mounted on each pedal lever on either side of the frame. Further, gear shifting is not sequential, that is, one is not required to sequentially shift from first to second to third gear and the like. The present inventions allows for rapid and accurately shifting to any gear that can be selected by the rider of the bicycle, in any order.

Concerning the dimensions included in the bicycle, reference will primarily be made to the embodiment of FIG. 1 of the drawings. It will be understood that while the bicycle incorporating aspects of the present invention may be a full size bicycle having wheels which are 27 inches in diameter, the dimensions given for full size bicycle may be scaled down for a child's bicycle. Typically, the wheel base of the bicycle, that is, the distance between the centers of the two wheels, may be in the order of 38 inches; however, this may range to as short as about 36 inches. There is no maximum limit to the wheel base of a bicycle incorporating embodiments of the present invention.

The forward portion of the pedal lever is generally approximately 12 inches from the pivot point of the pedal lever to the pivot point of the pedal itself, but the distance between pedal lever pivot point and pedal pivot point may also range from about 9 to 13 inches. The rear portion of the pedal lever, on which the slider moves, may be at least 10 inches in length, but more generally may range from about 9 inches to about 11½ inches in length.

It may also be noted that the slider when in its rearmost position as indicated by the slider 64 shown in FIG. 1 is located close to the hub of the bicycle, substantially as close as practical without mechanical interference. In addition, when the slider is in its fully forward most position, and the rear portion of the pedal lever is in its farthest back or counterclockwise position as shown in FIG. 1, the slider is in the order of 6 inches above the center of the rear wheel. On a more general basis, it would be expected that the slider could be from 4 to 10 inches above the center of the rear wheel, when it is in its forward most position of the pedal lever is in its furthest downward location.

Typically, the front portion of the pedal lever normally travels through an arc of approximately 90 degrees, but this may range from about 85 degrees to 100 degrees in the normal course of design. The lowest position of the pedals should be 4 to 6 inches above the ground to provide adequate clearance of the pedals from the ground when the bicycle goes around n turns, and also to accommodate the length of the toes of the rider which extend past the pedal to prevent interference between the riders toes and the rear of the front wheel.

Due to the novel design of the shifting and drive mechanisms of the bicycle incorporating various embodiments of the present invention, the size of the frame may be significantly reduced as compared with conventional bicycle frames. Thus the lowermost portion of the right frame is that which supports the rear hub of the bicycle. The pivot point is generally approximately 3½ inches above the center of the rear wheel, but in practice be from about 2½ to 10 inches. It may also be noted that the position of the seat is close to and just in front of the center of the rear wheel, thereby permitting a smaller frame for the overall bicycle, and providing better handling for the bike. Further, the pedal in its forward and upward position is disposed somewhat above the horizontal, ranging from about 3 degrees to about 30 degrees, depending on the requirements of the overall bicycle design. It is also desirable that the straight rear section of the rear portion of the pedal lever on which the slider moves tilts downwardly toward the rear hub, in its extreme downward position. This angle may be, for example, on the order of 10 degrees.

In conclusion, it is to be understood that the foregoing detailed description and the accompanying drawings relate to preferred and alternate embodiments of the invention. However, various features of the invention may be implemented in manners other than those precisely as shown in the present drawings. Thus, for example, the mechanical advantage of the bicycle may be changed in accordance with other constructions shown in my prior patents. Accordingly, it is to be understood that the present invention is not limited precisely to that shown and described in detail hereinabove.

I claim:

1. A pedal lever bicycle having a gear shift assembly for selecting a wide range of mechanical advantage ratios, comprising:

a front wheel, a rear wheel, and a frame interconnecting said front and rear wheels;

first and second pedal levers each having a forwardly extending portion and a rearwardly extending portion, said first and second pedal levers being pivotally mounted to said frame at a location substantially above the center of said rear wheel and rearward of the front of said rear wheel;

first and second sprockets mounted coaxially with said rear wheel for driving said bicycle;

first and second drive chains operatively connected to said first and second pedal levers, respectively, said first and second drive chains engaging said first and second sprockets, respectively, to supply power to said sprockets from said pedal levers;

first and second fixed notched plates fixedly mounted on the rearwardly extending portion of said first and second pedal levers, respectively, each having a surface defining a plurality of notches;

first and second movable notched plates movably mounted on the rearwardly extending portion of said first pedal lever adjacent to said first and second fixed notched plates, for movement relative to said first and second fixed notched plates, respectively, said first and second movable notched plates each having a surface defining a plurality of notches;

first and second sliders mounted for movement on said rearwardly extending portions said first and second pedal levers, respectively, each of said first and second sliders being connected to an end of said first and second drive chains, respectively, for varying a power ratio of the pedal lever bicycle, the first and second sliders operatively mounted for engaging said notches in said first and second movable notched plates, and said first and second fixed notched plates, respectively, for determining said power ratio; and a gear shifting assembly pivotally connected to said first and second notched plates for moving said first and second notched plates in relation to each other and to said first and second pedal levers, respectively, to position said first and second sliders, respectively, for thereby changing said power ratio as a function of slider position, said gear shifting assembly being responsive to a gear change signal to move said first and second notched plates and change said power ratio, and wherein said gear shifting assembly is mounted to said first and second pedal levers.

2. The pedal lever bicycle of claim 1, wherein said rearwardly extending portion of each of said first and second pedal levers has a dog-leg configuration.

3. The pedal lever bicycle of claim 1, wherein said first and second sliders each include a spring biased detent releasably engaging said notches in said first and second notched plates, respectively, relative movement of said first and second notched plates being operative to disengage said spring biased detent from said notches in said first and second notched plates to free said first and second sliders for longitudinal movement on said first and second pedal levers, respectively, by resolution of force applied to the first and second sliders by said first and second drive chains, respectively.

4. The pedal lever bicycle of claim 1, wherein said gear shifting assembly includes an actuator arm connected to the notched plates, and an upshift actuator for moving the actuator arm to increase said power ratio.

5. The pedal lever bicycle of claim 1, wherein said gear shifting assembly includes an actuator arm connected to the notched plates, and a downshift actuator for moving the actuator arm to decrease said power ratio.

6. The pedal lever bicycle of claim 1, wherein said gear shifting assembly comprises a gear shifting lever pivotally mounted to said first and second pedal levers and oriented substantially perpendicular to said rearwardly extending portions of said first and second pedal levers, and said gear shifting lever pivotally connected to one of said first and second notched plates.

7. The pedal lever bicycle of claim 1, wherein said gear shifting assembly comprises a gear selecting assembly including a plurality of push buttons each corresponding to a selectable gear.

8. The pedal lever bicycle of claim 7, wherein each of said plurality of push buttons is operative to be manually depressed and to remain depressed until another of said plurality of push buttons is depressed.

9. The pedal lever bicycle of claim 1, wherein said gear shifting assembly comprises a gear activating assembly including a plurality of retractable pivoted activator levers.

10. The pedal lever bicycle of claim 9, wherein said plurality of retractable pivoted activator levers are mounted substantially perpendicular to said frame and parallel to a plane of movement of said first and second pedal levers.

11. The pedal lever bicycle of claim 9, wherein said plurality of retractable pivoted activator levers each have a front portion and a rear portion, said front portion including a protruding member movable to contact a corresponding gear shifting member mounted on said first and second pedal levers, respectively, to cause movement of said gear shifting member to a predetermined position.

12. The pedal lever bicycle of claim 7, wherein said gear shifting assembly is mounted to said frame, and said gear selecting assembly is connected to said gear shifting assembly by a flexible connector.

13. The pedal lever bicycle of claim 1, wherein said first and second drive chains each have a first end and a second end, and further comprising first and second flexible resilient members, each of said flexible resilient members having a first end and a second end, the first end of the flexible resilient members being connected to the forwardly extending portion of the first and second pedal levers, respectively, the first end of the first and second drive chains connected to the first and second sliders, respectively, and the second end of the first and second drive chains connected to the second end of the first and second flexible members, respectively.

14. The pedal lever bicycle of claim 13, wherein the second ends of the first and second drive chains include a quick release fitting, and the second ends of the first and second flexible members include a quick release receiver configured to releasably receive the quick release fitting.

15. The pedal lever bicycle of claim 14, wherein the quick release fitting has a fixed portion, a curved portion, and a depressible portion, the quick release fitting having a selected diameter in a non-depressed state and a smaller diameter in a depressed state.

16. The pedal lever bicycle of claim 14, wherein the quick release receiver includes a plate having a hole formed therethrough, the hole having a diameter larger than the diameter of the quick release fitting when in its depressed state, but smaller than the diameter of the quick release fitting when in its non-depressed state.

17. The pedal lever bicycle of claim 15, wherein the depressible portion of the quick release fitting has a ramped area configured to interact with an edge of the plate surround the hole such that advancing the quick release fitting through the hole depresses the depressible portion of the quick release fitting allowing the quick release fitting to advance through the hole in the plate.

18. The pedal lever bicycle of claim 13, wherein each of the first and second flexible resilient members comprises a leaf spring.

19. The pedal lever bicycle of claim 18, wherein said leaf spring extends substantially upward.

20. The pedal lever bicycle of claim 1, wherein the frame includes first and second rearwardly extending portions, and further comprising first and second idler wheels rotatably mounted to said first and second rearwardly extending portions of the frame by an idler wheel quick release assembly.

21. The pedal lever bicycle of claim 20, wherein said first and second rearwardly extending portions each include a slotted plate connected thereto, each of said first and second idler wheels being rotatably mounted to one of said slotted plates of said first and second rearwardly extending portions of the frame by said idler wheel quick release assembly, said idler wheel quick release assembly including a spindle releasably secured to said slotted plate by a spring member retained on a first end portion of said spindle on a first side of said slotted plate and a locking cam-lever pivotally connected to a second end portion of said spindle on a second side of said slotted plate, with the idler wheel received between said spring member and said first side of said slotted plate.

22. The pedal lever bicycle of claim 1, wherein each of said first and second sliders is retained on said rearwardly extending portions of said first and second pedal levers, respectively, by a slider quick release assembly.

23. A pedal lever bicycle having a gear shift assembly for selecting a wide range of mechanical advantage ratios, comprising:
   a pedal arm assembly having a pedal disposed at a forwardly extending end and dog-leg shaped portion disposed at a rearwardly extending end, with a pivot means located therebetween;
   a pair of notched plates movably mounted on the rearwardly extending end of the pedal arm assembly;
   a slider mounted on the rearwardly extending portion of the pedal arm assembly for varying a power ratio of a gear train of a bicycle, the slider have means for engaging the notches in the pair of notched plates for determining the ratio for the application of power by the pedal arm assembly to a drive wheel of the bicycle;
   gear shifting means connected to the notched plates for moving the notched plates in relation to each other and to the pedal arm assembly to position the slider and thus changing the ratio for the application of power as a function of slider position, the shifting means responsive to a gear change signal to move the plates and change the ratio;
   a flexible member having a first end and a second end, the first end of the flexible member being connected to the forwardly extending portion of the pedal arm assembly at a point located between the pedal and the pivot means; and
   a drive chain having a first end and a second end, the first end of the drive chain connected to the slider and the second end of the drive chain connected to the second end of the flexible member.

24. The pedal lever bicycle of claim 23, wherein the gear shifting means includes an actuator arm connected to the notched plates, the actuator arm having upper and lower ends that move in opposite directions, and an upshift actuator that engages a shifting surface, the engagement imparting movement to the actuator arm, such that the ratio for the application of power is increased.

25. The pedal lever bicycle of claim 23, wherein the gear shifting means includes an actuator arm connected to the notched plates, the actuator arm having upper and lower ends that move in opposite directions, and a downshift actuator that engages a shifting surface, the engagement imparting movement to the actuator arm, such that the ratio for the application of power is decreased.

26. The pedal lever bicycle of claim 24, wherein said gear shifting means includes pivoted spring biased plates on which the shifting surfaces are situated.

27. The pedal lever bicycle of claim 26, wherein said gear shifting means includes a bypass means to prevent an unwanted change of gears.

28. The pedal lever bicycle of claim 25, wherein said gear shifting means includes pivoted spring biased plates on which the shifting surfaces are situated.

29. The pedal lever bicycle of claim 23, wherein the second end of the drive chain includes a quick connect fitting and the second end of the flexible member includes a quick connect receiver configured to receive the quick connect fitting.

30. The pedal lever bicycle of claim 29, wherein the quick connect fitting has a fixed portion, a curved portion, and a depressible portion, the quick connect fitting having a selected diameter in a non-depressed state and a smaller diameter in a depressed state.

31. The pedal lever bicycle of claim 30, wherein the quick connect receiver includes a plate having a hole formed therethrough, the hole having a diameter larger than the diameter of the quick connect fitting when in its depressed state, but smaller than the diameter of the quick connect fitting when in its non-depressed state.

32. The pedal lever bicycle of claim 31, wherein the depressible portion of the quick connect fitting has a ramped area configured to interact with an edge of the plate surround the hole such that advancing the quick connect fitting through the hole depresses the depressible portion of the quick connect fitting allowing the quick connect fitting to advance through the hole in the plate.

* * * * *